Oct. 16, 1945.    N. FLESCH    2,387,132
BRAKE HEAD BALANCING DEVICE
Filed July 5, 1943
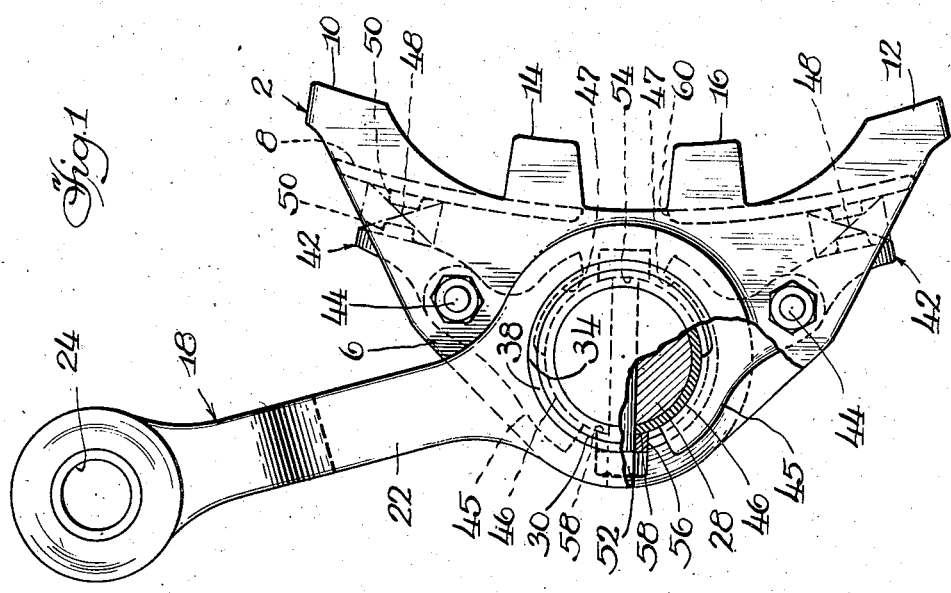
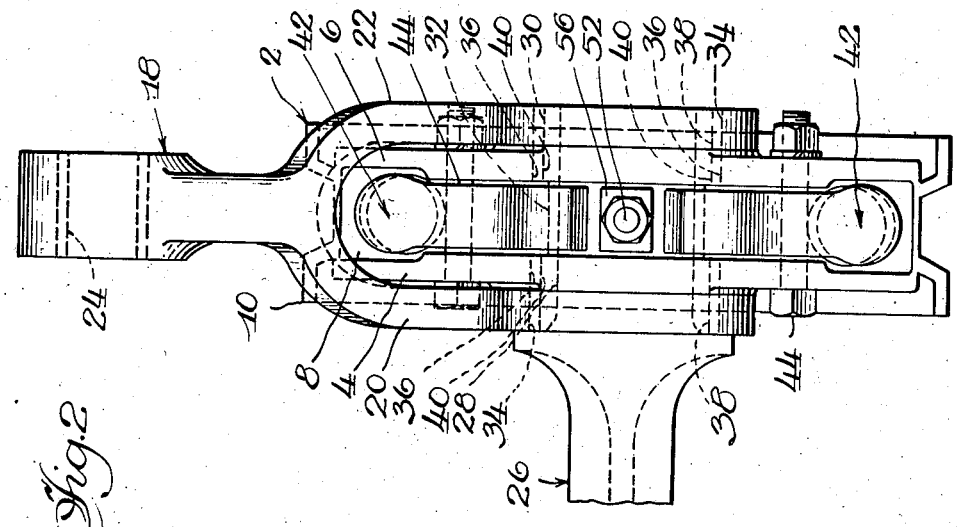
INVENTOR.
Norman Flesch,
BY
Atty.

Patented Oct. 16, 1945

2,387,132

UNITED STATES PATENT OFFICE 2,387,132

BRAKEHEAD BALANCING DEVICE

Norman Flesch, Chicago, Ill., assignor to American Steel Foundries, Chicago, Ill., a corporation of New Jersey Application July 5, 1943, Serial No. 493,548

24 Claims. (Cl. 188—236)

My invention relates to railway brake equipment and more particularly to mechanism for frictionally resisting the pivoting of a brake head at its point of connection to an associated brake beam, such mechanism being commonly known as a brake head balancing device.

An object of my invention is to provide a brake head balancing device of practical form and suitable for convenient application to a brake head utilized in a clasp or a single shoe brake arrangement for a railway car truck.

A specific object of my invention is to design a brake head balancing device capable of developing friction with the trunnion end of a brake beam, said trunnion end being adapted for pivotal connection to the associated brake head.

A different object of my invention is to provide a novel brake head housing one or more friction arms pivoted thereto, said arms being adapted to be resiliently urged into frictional engagement with an associated brake beam trunnion.

My invention comprehends a brake head of novel form comprising spaced side walls and a transverse wall extending therebetween and merging with end and intermediate brake head lugs, said transverse wall having an opening intermediate the ends thereof for the reception of an associated securing bolt.

My invention also comprehends friction arms of novel form each having a bearing portion for complementary engagement with an associated brake beam trunnion, and also having at the opposite end thereof a seat for an associated actuating spring.

In the drawing, Figure 1 is a side elevation of one embodiment of my invention with portions of the brake head and associated brake beam and hanger being broken away.

Figure 2 is an end elevation taken from the left as seen in Figure 1.

Describing my invention in detail, the brake head generally designated 2 comprises the spaced side walls 4 and 6 and the transverse wall 8 extending therebetween and merging therewith, said transverse wall also merging with spaced end or toe lugs 10 and 12, as well as spaced intermediate lugs 14 and 16, all of said lugs being formed and arranged for connection to an associated brake shoe in the conventional manner.

The hanger generally designated 18 is of bifurcated form with the spaced legs 20 and 22 adapted for the reception therebetween of the walls 4 and 6 of the brake head, the upper end of the hanger having a bushed opening 24 for pivotal connection to associated supporting means.

The brake beam generally designated 26 is provided with a trunnion end 28 carrying a bushing 30 offset or grooved as at 32 (Figure 2) for a purpose hereinafter more fully described. It will be understood that the bushing 30 is press fitted on the trunnion end. The trunnion end 28 extends through aligned openings 34, 34 in the hanger legs 20 and 22 respectively and through aligned openings 36, 36 in the brake head walls 4 and 6 respectively, the openings 34, 34 being bushed at 38, 38, and the openings 36, 36 being bushed at 40, 40.

Housed within the brake head 2 between the walls 4 and 6 thereof are upper and lower friction arms generally designated 42, 42 pivoted to the brake head at 44, 44 by means of bolt and nut assemblies, said arms having bearing portions 45, 45 frictionally engaging the bushing 30 at 46, 46 (Figure 1) within the offset or grooved portion thereof. It may be noted that the bearing portions of the friction arms are relieved at 47, 47 in order to facilitate the seating thereof against the bushing 30, as will be understood by those skilled in the art. Each friction arm 42 is actuated by a spring diagrammatically indicated at 48 (Figure 1), the arm 42 and the wall 8 of the brake head having aligned positioning means 50, 50 for said spring, which is compressed between the arm and the wall 8, as clearly illustrated in Figure 1.

A bolt and nut assembly 52 extends through complementary openings in the trunnion end 28 and the bushing 30 thereon, said bolt and nut assembly including a bolt with a head having a complementary arcuate surface for engagement at 54 with the bushing 30 within the groove 32, and a washer 56 with an arcuate surface for complementary engagement at 58 with said bushing 30. It will be understood that the bolt and nut assembly performs two functions, namely the limitation of pivotal movement of the brake head 2 on the trunnion end 28 of the beam by cooperation with adjacent portions of the friction arms, and also the prevention of accidental disassembly of the head 2 by "walking off" the beam 26 in a direction axially of the trunnion end 28.

This "walking off" movement of the brake head is also prevented by abutment of the bearing portions of the friction arms with the margin of the groove 32 in the bushing, thus preventing accidental disassembly of the head even though the bolt and nut assembly should break or be shaken loose. It may also be noted that in the event that one friction arm 42 should become inoperative for any reason, the other will continue to function until the device can be repaired.

It will be understood that the above described bushings may, if desired, be eliminated without altering the functional characteristics of the device except for the fact that the friction arms 42, 42 would no longer be effective to supplement the bolt and nut assembly 52 in preventing the brake head from "walking off" the beam.

In assembling my novel brake head balancing device, the brake head and brake hanger are placed in assembled relationship with the openings 34, 34 in alignment with the openings 36, 36. The resilient members 48, 48 are placed under compression by means of clamps engaged with the brake head and the arms 42, 42 in order that said arms will not interfere with assembly of the device. The head and the hanger are then slipped on the trunnion end 26 of the beam, and thereafter the clamps are removed so that the arms may assume their normal operative position as illustrated. The bolt of the bolt and nut assembly 52 may then be inserted through the opening 60 (Figure 1) in the brake head wall 8, and thereafter the washer 56 and the nut may be applied to said bolt. If desired, the opening 60 in the wall 8 may be eliminated, and the bolt and nut assembly may be reversed with the head thereof at the left as seen in Figure 1 and with the nut at the right end of the assembly.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake head balancing device, a brake head having spaced side walls and a transverse wall extending therebetween, a hanger having spaced legs receiving therebetween said spaced walls, aligned openings through said spaced walls and said legs, a beam having a trunnion end carrying a bushing for reception within said aligned openings, said bushing having a groove intermediate said spaced walls, lever arms pivoted to said spaced walls and disposed therebetween, corresponding ends of said arms being received within said groove for engagement with said bushing, resilient means compressed between said transverse wall and opposite corresponding ends of said arms, and a bolt and nut assembly disposed intermediate said arms and extending through complementary openings in said trunnion end and said bushing, said bolt and nut assembly being adapted for cooperation with said lever arms to limit pivotal movement of said head on said trunnion end.

2. In a brake head balancing device, a brake head having spaced side walls and a transverse wall extending therebetween, a hanger having spaced legs receiving therebetween said spaced walls, aligned openings through said spaced walls and said legs, a beam having a trunnion end received within said aligned openings, lever arms pivoted to said spaced walls and disposed therebetween, corresponding ends of said arms being frictionally engaged with said trunnion end, resilient means compressed between said transverse wall and opposite corresponding ends of said arms, and a bolt and nut assembly disposed intermediate said arms and extending through said trunnion end intermediate said side walls for cooperation therewith to prevent accidental disassembly of the brake head, said arms including means for cooperation with said bolt and nut assembly to limit pivotal movement of said brake head on said trunnion end.

3. In a brake head balancing device, a brake head having spaced side walls and a transverse wall extending therebetween, a hanger having spaced legs receiving therebetween said spaced walls, aligned openings through said spaced walls and said legs, a beam having a trunnion end received within said aligned openings, lever arms pivoted to said spaced walls and disposed therebetween, corresponding ends of said arms being frictionally engaged with said trunnion end, resilient means compressed between said transverse wall and opposite corresponding ends of said arms, and a bolt and nut assembly disposed intermediate said arms and extending through said trunnion end intermediate said side walls for cooperation therewith to prevent accidental disassembly of the brake head.

4. In a brake head balancing device, a brake head having spaced side walls and a transverse wall extending therebetween, a hanger having spaced legs receiving therebetween said spaced walls, aligned openings through said spaced walls and said legs, a beam having a trunnion end carrying a bushing for reception within said aligned openings, said bushing having a groove intermediate said spaced walls, lever arms pivoted to said spaced walls and disposed therebetween, corresponding ends of said arms being received within said groove for engagement with said bushing, resilient means compressed between said transverse wall and opposite corresponding ends of said arms, and a bolt and nut assembly disposed intermediate said arms and extending through complementary openings in said trunnion end and said bushing.

5. In a brake head assembly, a brake head, a hanger, a brake beam having a trunnion end extending through aligned openings in said head and said hanger, said trunnion end being provided with a grooved bushing, friction means carried by said head for frictional engagement with the groove in said bushing, said friction means including a plurality of friction arms pivoted to said head and engaged at corresponding ends thereof with said bushing, and resilient means compressed between opposite corresponding ends of said arms and adjacent portions of said brake head, and rigid means associated with said trunnion end and adapted for cooperation with said arms to limit pivotal movement of said head on said trunnion end.

6. In a brake head assembly, a brake head, a hanger, a brake beam having a trunnion end extending through aligned openings in said head and said hanger, said trunnion end being provided with a grooved bushing, and friction means carried by said head for frictional engagement with the groove in said bushing, said friction means including a plurality of friction arms pivoted to said head and engaged at corresponding ends thereof with said bushing, resilient means compressed between opposite corresponding ends of said arms and adjacent portions of said brake head, and positioning means on said arms and said brake head for said resilient means.

7. In a brake head balancing device, a brake head having spaced side walls and a transverse wall extending therebetween, a hanger having spaced legs receiving therebetween said spaced walls, aligned openings through said spaced walls and said legs, a beam having a trunnion end carrying a bushing for reception within said aligned openings, said bushing having a groove intermediate said spaced walls, lever arms pivoted to said spaced walls and disposed therebetween, corresponding ends of said arms being received within said groove for engagement with said bushing, and resilient means compressed between said transverse wall and opposite corresponding ends of said arms.

8. In a brake head balancing device, a brake head having spaced side walls and a transverse wall extending therebetween, a hanger having spaced legs receiving therebetween said spaced walls, aligned openings through said spaced walls and said legs, a beam having a trunnion end received within said aligned openings, lever arms pivoted to said spaced walls and disposed therebetween, corresponding ends of said arms being frictionally engaged with said trunnion end, resilient means compressed between said transverse wall and opposite corresponding ends of said arms, and aligned positioning means on each arm and the adjacent portion of said transverse wall for the associated of said resilient means.

9. In a brake head balancing device, a brake head having spaced side walls and a transverse wall extending therebetween, a hanger having spaced legs receiving therebetween said spaced walls, aligned openings through said spaced walls and said legs, a beam having a trunnion end received within said aligned openings, lever arms pivoted to said spaced walls and disposed therebetween, corresponding ends of said arms being frictionally engaged with said trunnion end, and resilient means compressed between said transverse wall and opposite corresponding ends of said arms.

10. In a brake head assembly, a brake head, a hanger, a brake beam having a trunnion end extending through aligned openings in said head and said hanger, said trunnion end being provided with a grooved bushing, and friction means carried by said head for frictional engagement with a friction surface within the groove in said bushing, said friction means including a plurality of friction arms pivoted to said head and engaged at corresponding ends thereof with said bushing, and resilient means compressed between opposite corresponding ends of said arms and adjacent portions of said brake head.

11. In a brake head assembly, a brake head, a hanger, a brake beam having a trunnion end extending through aligned openings in said head and said hanger, said trunnion end being provided with a grooved bushing, and friction means carried by said head for frictional engagement with the groove in said bushing, said friction means comprising a lever arm pivoted intermediate its ends from said head and engaged at one end thereof with a friction surface in said groove, and resilient means compressed between a portion of said head and the opposite end of said arm.

12. In a brake head balancing device, a brake head having spaced walls and a transverse wall extending therebetween, a hanger having spaced legs receiving therebetween said spaced walls, aligned openings through said spaced walls and said legs, a beam having a trunnion end extending through said aligned openings, a lever arm pivoted to said spaced walls and disposed therebetween, one end of said arm being in frictional cooperation with said trunnion end, resilient means compressed between the other end of said arm and said transverse wall, and means associated with said trunnion end and adapted for cooperation with said arm to limit pivotal movement of said head on said trunnion end.

13. In a brake head assembly, a brake head, a hanger, a brake beam having a trunnion end extending through aligned openings in said head and said hanger, and friction means carried by said head for engagement with said trunnion end, said friction means comprising a plurality of lever arms pivoted to said head and in frictional engagement with friction means on said trunnion end, and resilient means compressed between adjacent portions of said head and said arms to urge the latter into said engagement.

14. In a brake head assembly, a brake head, a hanger, a brake beam having a trunnion end extending through aligned openings in said head and said hanger, and friction means carried by said head for engagement with a friction surface on said trunnion end, said friction means including a lever arm pivoted between the ends thereof to the head, and resilient means compressed between and reacting against a portion of said head and a portion of said arm to urge said arm into engagement with said trunnion end.

15. In a brake head balancing device, a brake head having spaced side walls and a transverse wall extending therebetween, a hanger having spaced legs receiving therebetween said spaced walls, aligned openings through said spaced walls and said legs, a beam having a trunnion end received within said openings, friction means carried by said brake head between said spaced walls and said spaced legs for frictional engagement with said trunnion end, and means associated with said trunnion end and adapted for cooperation with said friction means to limit pivotal movement of said head on said trunnion end.

16. In a brake head, spaced side walls and a transverse wall extending therebetween, end and intermediate brake head lugs formed integrally with said transverse wall on one side thereof, aligned openings through said spaced walls for the reception of an associated beam, and spaced spring positioning means formed on said transverse wall on the opposite side thereof adjacent opposite ends thereof.

17. In a brake head assembly, a brake head, a hanger, a brake beam having a trunnion end extending through aligned openings in said head and said hanger, said trunnion end being provided with a grooved bushing, friction means carried by said head for frictional engagement with the groove in said bushing, and means associated with said trunnion end and adapted for cooperation with said friction means to limit pivotal movement of said head on said trunnion end.

18. In a balancing device for a brake head assembly including a brake beam with a trunnion end having a cylindrical perimeter and a brake head with an opening therethrough receiving said trunnion end, friction means carried by said head in frictional engagement with said perimeter for slidable movement thereagainst during pivotal movement of said head on said trunnion end, and hanger means connected to said assembly for supporting the same from an associated vehicle member, said friction means including a lever arm pivoted intermediate the ends thereof to the head and engaging said perimeter, and resilient means compressed between a portion of said head and said lever arm for urging said arm into said engagement.

19. In a friction arm for a brake head balancing device, a rigid member having pivot means intermediate its ends, a bearing portion at one end of said member extending outwardly on opposite sides thereof, an arcuate friction surface on said portion, and a spring seat at the opposite end of said member, the opposite ends of said bearing portion being formed with angularly arranged surfaces for engagement with an associated member in planes extending radially from the center of curvature of said friction surface to limit relative movement between said arm and said associated member.

20. In a balancing device for a brake head assembly including a brake head with an opening therethrough and a brake beam with a cylindrical portion extending through said opening for pivotal support of said head, the combination of hanger means connected to said assembly, a rigid friction element carried by said head and movable therewith, said element being frictionally engaged with said portion intermediate the ends thereof, resilient means bearing at opposite ends thereof against said head and said element for urging the latter into engagement with said portion, and stop means associated with said portion and adapted for engagement with said element to limit pivotal movement of said head on said portion.

21. In a balancing device for a brake head assembly including a brake head and a beam with a trunnion end extending therethrough for pivotal support thereof, hanger means connected to said assembly, a grooved bushing on said trunnion end, friction means carried by said head for frictional engagement with the groove in said bushing, and means associated with said bushing and trunnion end and adapted for engagement with said friction means to limit pivotal movement of said head on said trunnion end.

22. In a balancing device for a brake head assembly including a brake head and a beam with a trunnion end having a cylindrical perimeter extending through said head for pivotal support thereof, the combination of hanger means connected to said assembly, friction means carried by said head and frictionally engaged with said perimeter, said friction means including lever arms pivoted to said brake head on opposite sides of said trunnion end and in engagement with said perimeter, and resilient means compressed between said friction means and said head.

23. In a balancing device for a brake head assembly including a brake head and a beam with a trunnion end having a cylindrical perimeter extending through said head for pivotal support thereof, the combination of hanger means connected to said assembly, a friction member pivoted to said head and frictionally engaged with said perimeter intermediate the extremities of said trunnion end, resilient means seated at opposite ends thereof against said head and said member respectively, and aligned positioning means on said member and said head for said resilient means.

24. In a friction arm for a brake head, a rigid member having pivot means intermediate its ends, a bearing portion on one end of said member extending outwardly on opposite sides thereof, an arcuate friction surface on said portion extending substantially perpendicular to the plane of said member, and a spring seat on the opposite end of said member with positioning means for an associated spring, the opposite ends of said bearing portion being formed with angularly arranged surfaces for engagement with an associated member in planes extending radially from the center of curvature of said friction surface to limit relative movement between said arm and said associated member.

NORMAN FLESCH.